UNITED STATES PATENT OFFICE.

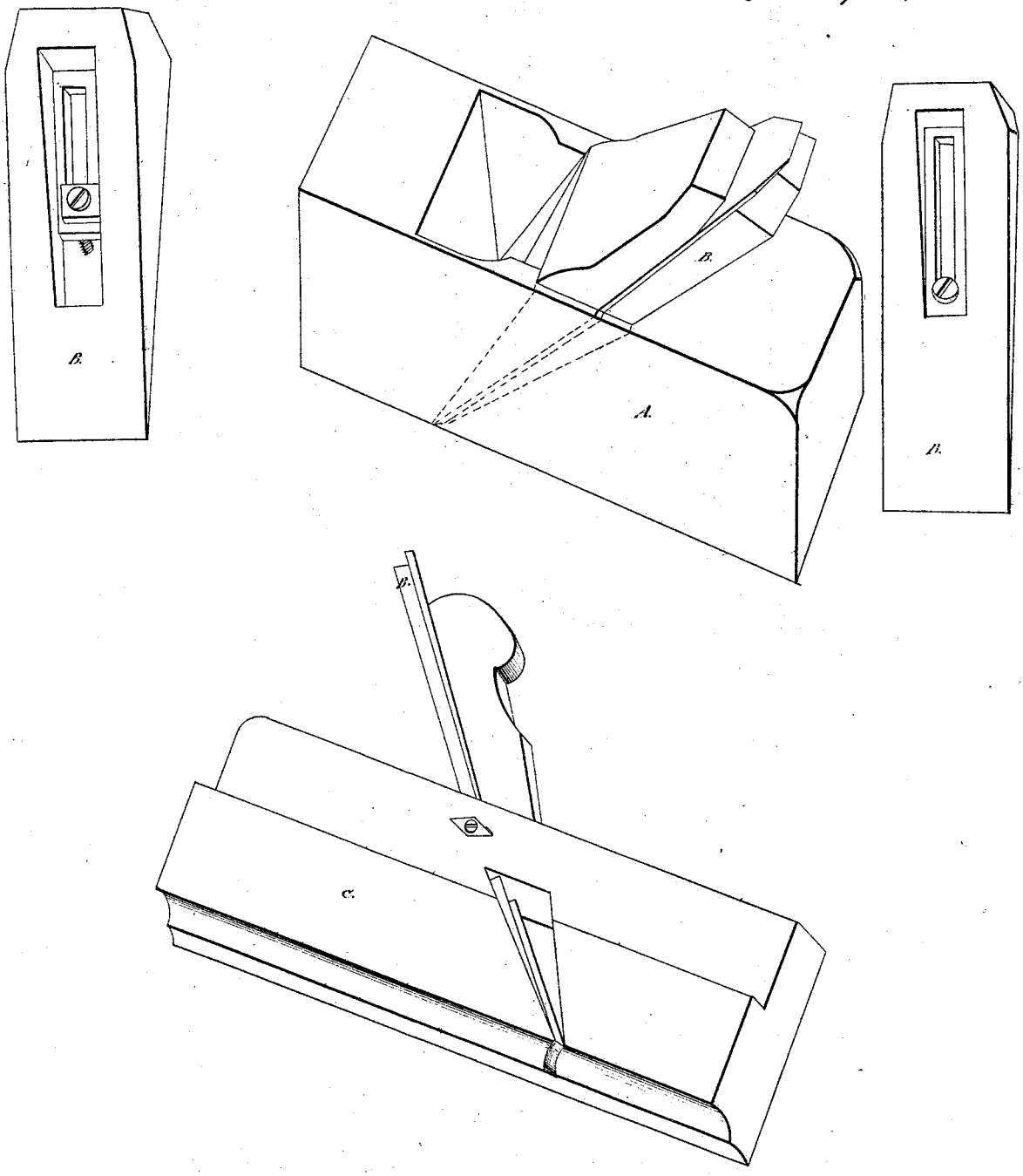

E. W. CARPENTER, OF LANCASTER, PENNSYLVANIA.

ADJUSTING THE POSITION OF PLANE-IRONS AND REGULATING THE THROATS OF PLANES.

Specification of Letters Patent No. 6,226, dated March 27, 1849.

*To all whom it may concern:*

Be it known that I, EMANUEL W. CARPENTER, of Lancaster city, in the county of Lancaster and State of Pennsylvania, have invented a new Improvement in the Regulation of the Mouths in Planes so as to Enlarge or Diminish the Same and for the Preservation of a Close Mouth in Planes; and I do hereby declare that the following is a full, clear, and exact description of the construction and operation of the same, reference being had to the annexed drawings, making a part of this specification.

The object contemplated by my improvement, is the regulation of the mouth in planes, so as to enlarge or diminish the same; and for the preservation of a close mouth in planes.

To enable others skilled in the art to make and use my invention, I will proceed to describe its construction and operation, as follows, viz.:

A is a bench plane with the improvement.

B represents the wedge or key, with a longitudinal aperture, over which is a scutcheon, inlaid with a similar aperture but not so wide, leaving room for the head of the screw to rest upon, (or by a washer or plate, as shown in the key in the double bit) for the purpose of fastening the key to the upper part of the bed of the plane, under the bit, by means of which the mouth of the plane can with ease be tightened by gently driving the key downward, or with equal ease enlarged, by drawing back the same.

The improvement is applicable to all kinds of planes.

The wedge or key in the double-bit plane is similar to that in the single-bit, with the exception of the opening left below the longitudinal aperture to receive the head of the screw that fastens the cap to the bit. A washer or plate is here used instead of the scutcheon as in the single-bit, to show its application, but the scutcheon is equally applicable.

C, is the molding plane, with the improvement. The wedge or key in the molding plane, is shaped like the bit, but the key part somewhat longer, and tapered down to the face of the plane; the bed of which, is cut to suit the bevel or shape of the key B. The screw is here inserted at the upper side of the plane, to keep the key B, permanent while setting the bit.

What as I claim as my invention, and desire to secure by Letters Patent is—

The regulation of the mouth in planes, so as to enlarge or diminish the same, and for the preservation of a close mouth in planes, as herein described, by a wedge or key (B) being placed under the bit, and fastened by a screw.

E. W. CARPENTER.

Witnesses:
W. WHITESIDE,
P. DONNELLY.